United States Patent
Sato et al.

[11] Patent Number: 5,610,269
[45] Date of Patent: Mar. 11, 1997

[54] PROCESS FOR MANUFACTURING THERMOSETTING RESIN PARTICLES

[75] Inventors: Haruhiko Sato, Yawata; Yutaka Harada, Suita, both of Japan

[73] Assignee: Nippon Paint Company, Ltd., Osaka, Japan

[21] Appl. No.: 574,130

[22] Filed: Dec. 18, 1995

[30] Foreign Application Priority Data

Oct. 3, 1995 [JP] Japan ................... 7-279734

[51] Int. Cl.$^6$ ........................................ C08F 6/18
[52] U.S. Cl. ........................... 528/499; 528/503
[58] Field of Search ........................ 528/499, 503

[56] References Cited

U.S. PATENT DOCUMENTS 4,043,952  8/1977  Ganslaw et al. ................ 525/353

*Primary Examiner*—Thomas R. Weber
*Attorney, Agent, or Firm*—Millen, White, Zelano, & Branigan, P.C.

[57] ABSTRACT

Thermosetting resin particles having a narrow particle size distribution useful for powder coating application are produced by the steps of (a) providing a first water-soluble polymer having a cloud point within the range between 30° C. and 90° C. and a second water-soluble polymer not having any cloud point; (b) preparing an aqueous suspension in which an organic solvent-containing, liquid thermosetting resin composition is suspended as primary particles of oil droplets in an aqueous suspension medium containing the first and second water-soluble polymers, (c) heating the suspension to a temperature higher than the cloudy point to allow the oil droplets to agglomerate into secondary particles of larger particle sizes, (d) removing the organic solvent contained in the particles during or after step (c) and optionally (e) recovering the particles.

18 Claims, No Drawings

PROCESS FOR MANUFACTURING THERMOSETTING RESIN PARTICLES

BACKGROUND OF THE INVENTION

This invention relates to a process for manufacturing thermosetting resin particles, particularly for powder coating use, having a narrow particle size distribution.

There are a number of reports and patent literature addressing the manufacture of micron size resin particles having a narrow particle size distribution. One of known methods for manufacturing such resin particles is the suspension polymerization method in which vinyl monomers containing an oil-soluble initiator are dispersed as oil droplets in an aqueous medium containing a stabilizer and then polymerized. However, this method gives resin particles having a wide particle distribution under normal stirring conditions. This is because polymer particles tend to adhere to reaction vessel walls or mixing propellers and the particle size distribution depends mainly upon the incidence of agglomerating and splitting of monomer droplets. In order to prevent these phenomena from happening, several methods have been proposed including the use of viscous monomer droplets in suspension polymerization by dissolving a portion of polymer in the monomer or partly polymerizing the monomer in bulk prior to the suspension polymerization. Other methods include the use of strongly surface active stabilizer or water-insoluble inorganic particles in the dispersing medium. These methods are generally effective to decrease the proportion of coarse particles because of improved mixing efficiency and decreased agglomeration but they are not effective to decrease the proportion of fine particles. Consequently, the particle size distribution represented by the ratio of weight average particle size to number average particle size can be improved only slightly by these methods.

The seed polymerization and swelling method disclosed in JP-A-58106554 can give linear or crosslinked vinyl polymer particles having a very narrow particle size distribution in which the weight average particle size nearly equals the number average particle size. Unfortunately, this method requires a number of steps for growing polymer particles, making it unsuitable for a large scale industrial application. In addition, it cannot be applied to the manufacture of polymer particles including foreign matter such as pigments.

JP-A-03200976 discloses a method for manufacturing colored or pigmented polymer particles in which monomers are polymerized in a dispersion in nonaqueous systems or solvent-water mixture systems. Because a large quantity of solvent is used, this method suffers from safety and environmental problems in handling, recovering or otherwise processing used solvents.

All of the methods discussed supra utilize a radical polymerization of vinyl monomers and produce only vinyl based polymer particles having limited area of use. Furthermore, they are not applicable to the manufacture of particles including those substances having adverse effects on the polymerization reaction, for example, some dyes and pigments or UV absorbers and antioxidants abundantly used in automobile finishes.

Recently much interest has been focussed on powder coating in finishing automobile bodies and parts, household electrical apparatuses, building materials and the like for the purposes of eliminating the emission of organic solvents to the environment. Powder coating compositions are generally produced by blending a binder resin with a crosslinker and optionally other additives such as pigments, kneading the mixture under heat to make a molten mass, pulverizing the mass and then classifying pulverized particles. The resulting particles are applied on a substrate using electrostatic spray coating, fluidized bed coating or other methods to form a film, and then baking the film. However, most of the prior art powder coating compositions have certain defects. Since they tend to cause premature curing before use, chemicals or substances which react at a relatively low temperature cannot be added. Because the weight average particle size of conventional powder coating compositions normally lie at around 30 µm, they are not satisfactory in terms of smoothness, luster and other aesthetic properties of finished films. Attempts have been made to produce finer particles having a weight average particle size of 10 µm or less by means of jet mills or other air stream mills. This approach is found effective to obtain much smoother and thinner films than the films of conventional powder coating compositions. On the other hand, this powder coating composition comprises not only a large portion of microfine particles but also particles of irregular configuration. This makes the powder less free-flowing and increases the incidence of clogging of pneumatic conveyer pipes. Furthermore, it is conventional practice to recover and reuse excessively applied powder in powder coating technology. If the proportion of microfine particles increases in the recovered powder, not only will pneumatic transportation become more difficult but also deposition efficiency of the powder onto the substrate will be greatly impaired.

Therefore, a need exists for a process for manufacturing powder coating compositions free from above-discussed problems.

SUMMARY OF THE INVENTION

The present invention provides a process for manufacturing thermosetting resin particles comprising the steps of:

(a) providing a first water-soluble polymer having a cloud point within the range between 30° C. and 90° C. and a second water-soluble polymer not having any cloud point;

(b) preparing an aqueous suspension of an organic solvent-containing, liquid thermosetting resin composition having a temperature of lower than the cloud point of said first water-soluble polymer, in which said resin composition is suspended as primary particles of oil droplets having a number average particle size of less than 10 microns, in an aqueous suspension medium containing said first and second water-soluble polymers;

(c) heating said suspension to a temperature higher than said cloud point to allow said primary particles to agglomerate and fuse into secondary particles having a number average particle size from 2 to 20 times greater than that of the primary particles;

(d) distilling off the organic solvent from said secondary particles during or after step (c); and optionally (e) recovering said secondary particles from the suspension.

DESCRIPTION OF THE PREFERRED EMBODIMENTS

This invention utilizes as its principle a surface chemical phenomenon in which a stable suspension of oil droplets in an aqueous solution of a water-soluble polymer having a cloud point becomes less stable when the suspension is heated to a temperature above the cloud point and the oil droplet particles therein grow up to larger secondary particles by agglomeration and fusing. In order to control the particle size or to prevent phase separation, the suspension medium used in this invention also contains a water-soluble polymer not having such cloud point as a temperature-independent stabilizer.

Typical examples of water-soluble polymers having a cloud point within the range between 30° C. and 90° C. include polyvinyl alcohol based polymers having a hydrophobic group or block such as partly saponified polyvinyl alcohol (partly saponified polyvinyl acetate) having a degree or saponification of not greater than 85%, partly formalized polyvinyl alcohol or ethylene-vinyl acetate copolymer (saponified EVA); cellulose derivatives such as methylcellulose or hydroxypropylcellulose; and non-ionic surfactants such as polyethylene glycol monoalkyl ethers or ethylene oxide-propylene oxide block copolymers. Water-soluble polymers not exhibiting cloud point themselves may be modified to have a cloud point within the above range by adding an amount of an electrolyte to their aqueous solutions. Two or more water-soluble polymers having a cloud point may be used in combination.

Typical examples of water-soluble polymers not having such cloud point include fully saponified polyvinyl alcohol, partly saponified polyvinyl alcohol having a degree of saponification of greater than 85%, ethylcellulose, hydroxyethyl cellulose, polyethylene glycol and the like.

The weight ratio of the water-soluble polymer not having cloud point to the water-soluble polymer having cloud point may vary within a wide range depending upon the nature thereof and is generally from 99:1 to 10:90 to control the size of secondary particles in a suitable range.

The resin component from which particles are made according to this invention may be any resin which is thermally curable and also soluble or swellable in conventional organic solvents. Such resins are well-known in the art and their selection is to be made depending upon the intended use of resin particles and properties required therefor. Examples thereof includes polyesters, (meth)acrylate ester copolymers, aromatic vinyl compound copolymers, epoxy resins, phenol resins, melamine-formaldehyde resins, urea-formaldehyde resins and other thermosetting resins. Resins which are not thermosetting themselves, such as polyester resins, (meth)acrylate ester copolymers or aromatic vinyl compound copolymers are combined with an external crosslinker. Polymers not soluble in a conventional solvent such as polyethylene or polypropylene may be incorporated into the resin particles by dispersing in a solvent-soluble resin component.

Any organic solvent which is substantially immiscible with water, namely having a solubility in water of less than 10%, and has a boiling point of lower than 100° C. or is capable of forming an azeotropic mixture with water may be used in this invention. This is because the resin solution should be capable of forming oil droplets in water.

For use in powder coating application, the resin component preferably consists of an epoxy, acrylic or polyester resin in combination with an appropriate crosslinker thereof. Examples of crosslinkers include, as is well-known in the art, polycarboxylic anhydrides, dicyandiamide or acrylic resins for epoxy resins; polycarboxylic acids, epoxy resins or melamine resins for acrylic resins; and polycarboxylic acids and anhydrides, epoxy compounds, melamine resins or blocked polyisocyanates for polyester resins.

Particles for powder coating use may optionally contain various pigments such as titanium dioxide, ferric oxide, yellow iron oxide, carbon black, phthalocyanine blue or quinacridon red; surface conditioners such as polysiloxane or acrylic resins; plasticizers; UV absorbers; antioxidants; pigment dispersants; catalysts such as amines, imidazoles or cation polymerization initiators; and other resins. These additives may be dissolved or dispersed in the resin solution.

According to this invention, the liquid thermosetting resin composition containing an organic solvent is dispersed in an aqueous solution containing a water-soluble polymer having cloud point and a water-soluble polymer not having cloud point in step (b) at a temperature below said cloud point so that the mixture forms a suspension in which the liquid resin composition is suspended as primary particles of oil droplets having a number average particles size of less than 10 µm. The proportions of the water-soluble polymer having cloud point and the water-soluble polymer not having cloud point may be varied, as stated before, depending upon the nature of particular liquid resin composition and the desired particle size. In order to facilitate mixing, the total concentration of the water-soluble polymers in the aqueous solution is preferably from 0.02 to 20% by weight, and the ratio of the liquid resin composition to the aqueous solution is preferably from 1:0.5 to 1:3. Mixing of these two components may be accomplished by means of a homogenizer when their viscosities are relatively low. When their viscosities are relatively high, mixing may be accomplished by means of a universal mixer or a planetary mixer. In cases where the liquid resin composition and the aqueous solution do not initially form a suspension, the liquid resin composition is dispersed first in an aqueous solution solely containing the water-soluble polymer not having cloud point optionally in combination with a conventional surfactant to make a suspension. Thereafter the water-soluble polymer having cloud point may be added to the suspension. The suspension is adjusted to a final resin composition concentration of from 10 to 50% by weight by diluting, where necessary, with deionized water.

The suspension thus produced is heated in step (c) to a temperature higher than the cloud point. This temperature depends on the cloud point of a particular water-soluble polymer and the nature of a particular liquid resin composition. A portion of the organic solvent contained in the liquid resin composition will be distilled off during the course of this heating or by subsequently heating the suspension to a temperature higher than the cloud point. Oil droplets initially formed as primary particles will normally agglomerate into secondary particles of large size as the temperature increases above the cloud point. In order to accomplish a desired particle size in the final particles, the growth of oil droplets may be terminated by distilling off remaining portions of the organic solvent to increase the viscoelasticity of the particles or cooling the suspension to a temperature below the cloud point. As stated before, this may also be done by selecting appropriate ratio of the water-soluble polymer not having cloud point to the water-soluble polymer having a cloud point.

The temperature at which the solvent is distilled off in step (d) may be easily controlled by applying vacuum or reduced pressure. Therefore, resin particles containing a component susceptible to a chemical reaction itself or with another component at a predetermined temperature, as in case of powder coating compositions, can be produced by using a water-soluble polymer having a cloud point substantially lower than the reaction temperature and distilling off the organic solvent at a temperature below the reaction temperature in vacuo.

The present invention thus enables to control oil droplets in the suspension to be of relatively uniform size. Although the present invention is not bound to a particular theory or principle, the mechanism behind the formation of relatively uniform size of particles is postulated as follows. The water-soluble polymer having a cloud point present as a stabilizer of oil droplets in the dispersion, becomes less soluble in water and less effective to stabilize the suspension as the temperature increases above the cloud point. As a consequence the total surface area of dispersed phase decreases and finer particles tend to agglomerate with each other into larger secondary particles to accomodate the decrease in the total surface area of dispersed phase. Since finer particles have larger specific surface areas than coarse particles, they will preferentilly agglomerate into larger secondary particles. This contributes to a narrow particle size distribution of secondary particles even when starting from primary particles having wider particle size distributions.

After the organic solvent contained in the second particles is removed, the final particles may be recovered from the suspension by any conventional means such as filtering or centrifugation, and then dried. The final particles thus obtained generally have a ratio of weight average particle size to number average particle size of less than 2.

In addition to a narrow particle size distribution, the present invention can achieve other significant advantages. For example, the present invention enables the melting point and/or pigment dispersibility of the final particles to be easily adjustable. It also enables modifying the surfaces of particles to have various functional groups. Contrary to the prior art methods, it is possible to incorporate into the particles an additive which would adversely affect the polymerization reaction of monomers or use a variety of resins, crosslinkers and additives such as epoxy resins, acrylic resins, polyester resins, polycarboxylic acids, blocked polyisocyanate, pigments, surface conditioners or UV absorbers.

For powder coating application, since the resin particles produced by the present invention not only have a predetermined particle size but also consist mainly of spherical particles with lesser proportions of microfine and irregular shape particles than particles produced by the prior art methods, they are free-flowing and produce a thin coating film having excellent appearance properties.

The present invention can also be applied to the manufacture of particles of thermoplastic resins. For example, the present invention could be applied to the production of toners for electrophotography by mixing a thermoplastic resin such as styrene/acrylic or polyester resins with a pigment such as carbon black and a electrostatic charge controlling agent such as azo- or nigrosine dyes.

EXAMPLES

The following examples are given for illustrative purposes only but are not limiting. All parts and percents therein are by weight unless otherwise specified.

Production Example 1

Resin solution A

A reactor equipped with a stirrer, condenser, thermometer and nitrogen gas tube was charged with 63 parts of xylene and heated to 130° C. To this was added the following monomer mixture over 3 hours under nitrogen gas atmosphere.

| Material | Parts |
| --- | --- |
| Glycidyl methacrylate | 40 |
| Styrene | 25 |
| Methyl methacrylate | 25 |
| Isobutyl methacrylate | 10 |
| t-Butyl peroctoate | 3 |

Thereafter the mixture was maintained at the same temperature for 30 minutes. After adding 1 part of t-butyl peroctoate over 30 minutes, the mixture was maintained at the same temperature for 1 hour and then cooled to room temperature.

Production Example 2

Resin solution B

A reactor equipped with a stirrer, condenser and thermometer was charged with the following materials.

| Material | Parts |
| --- | --- |
| Isophthalic acid | 35 |
| Phthalic anhydride | 31 |
| Neopentyl glycol | 41 |
| Diethylene glycol | 5 |
| Dibutyltin oxide | 0.06 |

The mixture was heated to 190° C. and then to 240° C. over 3 hours while removing water. The condensation reaction was then continuted until an acid number of 5 was reached. After the reaction, the product was cooled to 100° C. and dissolved in 100 parts of xylene.

Example 1

A thermosetting resin composition was produced by mixing the following materials in a sand grind mill.

| Material | Parts |
| --- | --- |
| Resin solution A | 84.70 |
| Curing agent (1,10-decanedicarboxylic acid sold by Ube Industries, Ltd.) | 12.70 |
| Polysiloxane surface conditioner (YF-3919 sold by Toshiba Silicone Co., LTd) | 0.10 |
| Benzoin | 0.30 |
| UV absorber | 1.20 |
| Hindered amine antioxidant | 1.00 |
| Total | 100.00 |

Separately, an aqueous solution was prepared by dissolving 6 parts of GOHSENOL GH-20 (polyvinyl alcohol having a degree of saponification of 88% sold by The Nippon Synthetic Chemical Industry Co., Ltd.) and 4 parts of GOHSENOL KL-05 (polyvinyl alcohol having a degree of saponification of 80% sold by The Nippon Synthetic Chemical Industry Co., Ltd.) in 90 parts of deionized water.

The above resin composition and the aqueous solution were mixed in a homogenizer at $10^4$ r.p.m. to make a suspension. The particle sizes of suspended droplets were determined using a Coulter counter. The weight average particle size was 4.6 μm and the number average particle size was 2.1 μm.

The suspension was then diluted with 300 parts of deionized water and placed in a container equipped with a stirrer, temperature control means, reflux condenser and pressure reducing means. Then the suspension was heated to 70° C. under a reduced pressure of 160 Torr until the solvent in the dispersed phase was completely removed and cooled to room temperature. The resin particles thus produced were recovered by centrifugation, dried and tested for their particle size using a Coulter counter. The weight average particle size was 8.6 μm and the number average particle size was 6.2 μm. Thus, the particle size distribution curve was very sharp.

Example 2

Example 1 was followed except that the aqueous water-soluble polymer solution was replaced with a solution of 10 parts of GOHSENOL GH-20 and 2 parts of METOLOSE 65SH (methyl cellulose sold by Shin-Etsu Chemical Co., Ltd.) in 82 parts of deionized water. The weight average particle size and the number average particle size of oil droplets in the resulting suspension were 5.1 μm and 2.3 μm, respsectively.

The suspension was then diluted with 300 parts of deionized water and placed in a container equipped with a stirrer, temperature control means, reflux condense and pressure reducing means. After removing about 90% of the solvent contained in the dispersed phase by applying a reduced pressure of 20 Torr, the remaining solvent was completely removed by heating the suspension to 70° C. at a reduced pressure of 160 Torr. After cooling, the suspension was centrifuged and the separated particles were dried. The resin particles were found to possess a weight average particle size of 8.0 μm and a number average particle side of 6.8 μm, exhibiting a sharp particle size distribution curve.

Example 3

Example 1 was followed except that the aqueous water-soluble polymer solution was replaced with a solution of 10 parts of GOHSENOL GH-20 and 0.5 parts of METOLOSE 65SH in 82 parts of deionized water. The weight average particle size and the number average particle size of oil droplets in the suspension were 4.7 μm and 2.2 μm, respectively.

The suspension was diluted with 300 parts of deionized water and then placed in the same container as used in the preceding Examples. After removing about 90% of the solvent from the dispersed phase by applying a reduced pressure of 20 Torr, the remaining solvent was completely removed by heating the suspension to 70° C. at a reduced pressure of 160 Torr. After cooling, the suspension was centrifuged and the separated particles were dried. The resin particles were found to possess a weight average particle size of 8.6 μm and a number average particle size of 4.4 μm, exhibiting a sharp particle size distribution curve.

Comparative Example 1

Example 1 was followed except that the aqueous water-soluble polymer solution was replaced with a solution of 10 parts of GOHSENOL GH-20 in 82 parts of deionized water. The weight average particle size and the number average particle size of oil droplets in the suspension were 8.6 μm and 3.3 μm, respectively.

The suspension was diluted with 300 parts of deionized water and then placed in the same container as used in the preceding Examples. After removing about 90% of the solvent from the dispersed phase by applying a reduced pressure of 20 Torr, the remaining solvent was completely removed by heating the suspension to 70° C. at a reduced pressure of 160 Torr. After cooling, the suspension was centrifuged and the separated particles were dried. The powder coating composition thus produced were found to possess a weight average particle size of 8.9 μm and a number average particle size of 3.4 μm, exhibiting a broad particle size distribution curve. Most of particles were of sizes of oil droplets initially formed as primary particles.

Example 4

A thermosetting resin composition was produced by mixing the following materials in a sand grind mill.

| Material | Parts |
| --- | --- |
| Resin solution B | 80 |
| Epoxy resin (EPOTOHTO YD-014 sold by Toto Kasei K.K.) | 5 |
| Methyl isobutyl ketone | 10 |
| Curing agent (blocked polyisocyanate) | 10 |
| Benzoin | 0.3 |
| Polysiloxane surface conditioner | 0.1 |
| Titanium dioxide | 20 |
| Total | 100 |

Separately, a water-soluble polymer solution was produced by dissolving 4 parts of GOHSENOL GH-20 and 3 parts of GOHSENOL KL-05 in 93 parts of deionized water.

The above resin composition and the aqueous solution were mixed in a planetary mixer to obtain a suspension of oil droplets having a weight average particle size of 4.2 μm and a number average particle size of 2.0 μm.

The suspension was then diluted with 250 parts of deionized water and 50 parts of a 5% aqueous solution of hydroxypropyl cellulose, and then placed in the same container as used in the preceding Examples. After removing about 90% of the solvent from the dispersed phase by applying a reduced pressure of 20 Torr, the remaining solvent was completely removed by heating the suspension to 70° C. at a reduced pressure of 160 Torr. After cooling, the suspension was centrifuged and the separated particles were dired. The particles were found to possess a weight average particle size of 9.6 μm and a number average particle size of 7.1 μm, exhibiting a sharp particle size distribution curve.

Example 5

Example 4 was followed except that the aqueous solution was replaced with a solution containing 2 parts of GOHSENOL GH-20 and 8 parts of GOHSENOL KL-05 in 93 parts of deionized water. A suspension of oil droplets having a weight average particle size of 4.5 μm and a number average particle size of 2.1 μm was obtained.

The suspension was diluted with 250 parts of deionized water and 50 parts of a 5% aqueous solution of hydroxypropyl cellulose, and placed in a container as used in the preceding Examples. After removing about 90% of the solvent contained in the dispersed phase by applying a reduced pressure of 20 Torr, the remaining solvent was completely removed by heating the suspension to 70° C. at a reduced pressure of 160 Torr. After cooling, the suspension was centrifuged and the separated particles were dried. The particles thus produced were found to possess a weight average particle size of 15.3 μm and a number average particle size of 7.9 μm, exhibiting a sharp particle size distribution curve.

Comparative Example 2

Example 4 was followed except that the aqueous solution was replaced with a solution of 10 parts of GOHSENOL GH-20 in 82 parts of deionized water to produce a suspension of oil droplets having a weight average particle size of 10.9 μm and a number average particle size of 3.2 μm.

very good: Not accumulated at all.

Good: Not substantially accumulated.

Bad: Injector or hose was clogged.

The test results are shown in Table 1.

TABLE 1

|  | Evaluation of powder coating compositions | | | | | | |
|---|---|---|---|---|---|---|---|
|  | Examples | | | | | Comparative Ex. | |
|  | 1 | 2 | 3 | 4 | 5 | 1 | 2 |
| Weight average particle size, μm | 8.6 | 8.0 | 8.6 | 9.6 | 15.3 | 8.9 | 11.3 |
| Number average particle size, μm | 6.2 | 6.8 | 4.4 | 7.1 | 7.9 | 3.4 | 3.2 |
| Appearance, NSIC in % | 82 | 84 | 74 | 80 | 70 | 69 | 53 |
| Workability | Very Good | Very Good | Good | Very Good | Very Good | Bad | Bad |

The suspension was diluted with 300 parts of deionized water and placed in the container as used in the preceding Examples. After removing about 90% of the solvent contained in the dispersed phase by applying a reduced pressure of 20 Torr, the remaining solvent was completely removed by heating the suspension to 70° C. at a reduced pressure of 160 Torr. After cooling, the suspension was centrifuged and the separated particles were dried. The particles thus produced were found to possess a weight average particle size of 11.3 μm and a number average particle size of 3.2 μm, exhibiting a wide particle size distribution curve. Most of particles were of sizes of oil droplets initially formed as primary particles.

Comparative Example 3

Example 4 was followed except that the aqueous solution was replaced with a solution containing 8 parts of GOHSENOL KL-05 and 2 parts of METOLOSE 65SH in 82 parts of water. A suspension of oil droplets having a weight average particle size of 4.2 μm and a number average particle size of 1.7 μm was obtained.

After diluting with 300 parts of deionized water, the suspension was placed in the same container as used the preceding Examples. After removing about 90% of the solvent contained in the dispersed phase by applying a reduced pressure of 20 Torr, the remaining solvent was completely removed by heating the suspension to 70° C. at a reduced pressure of 20 Torr. The product contained a large amount of cakes or coarse particles, making it unusable for powder coating.

The powder coating compositions produced in Examples 1–5 and Comparative Examples 1–2 were tested for their performance. Each composition was applied electrostatically on a steel plate and baked at 160° C. for 30 minutes to produce a cured film of 50 μm film thickness. The appearance was evaluated in terms of NSIC (%) measured by a reflected image distinctiveness meter (Suga Testing Instrument Co., Ltd.).

Applicator systems used in the powder coating technology normally comprise a powder feeder (fluidized bed), injector, conveying hose and spray gun. Workability of powders of Examples and Comparative Examples was evaluated by operating the above applicator for 1 hour continuously with each powder, and judged based on the volume of powder accumulated in the injector and the hose according to the following schedule.

We claim:

1. A process for manufacturing thermosetting resin particles comprising
   (a) providing a first water-soluble polymer having a cloud point within the range between 30° C. and 90° C. and a second water-soluble polymer not having any cloud point;
   (b) preparing an aqueous suspension containing said first and second water-soluble polymers and an organic solvent-containing, liquid thermosetting resin composition having a temperature of lower than the cloud point of said first water-soluble polymer, in which said resin composition is suspended as primary particles of oil droplets having a number average particle size of less than 10 microns;
   (c) heating said suspension to a temperature higher than said cloud point to allow said primary particles to agglomerate and fuse into secondary particles having a number average particle size from 2 to 20 times greater than that of the primary particles; and
   (d) distilling off the solvent from said secondary particles during or after step (c).

2. The process according to claim 1 further comprising recovering said secondary particles from the suspension.

3. The process according to claim 1 wherein the ratio of said polymer having a cloud point to said polymer not having cloud point is from 1:99 to 90:10 by weight.

4. The process according to claim 1 wherein said water-soluble polymer having a cloud point is polyvinyl alcohols having a degree of saponification of less than 85%, partly formalized polyvinyl alcohols, ethylene-vinyl alcohol copolymers, methyl cellulose, hydroxypropyl cellulose, polyethylene glycol monoalkyl ethers, or ethylene oxide-propylene oxide block copolymers.

5. The process according to claim 1 wherein said water-soluble polymer not having cloud point is polyvinyl alcohols having a degree of saponification of greater than 85%, ethyl cellulose, hydroxyethyl cellulose or polyethylene glycols.

6. The process according to claim 1 wherein said organic solvent has a boiling point of lower than 100° C. or is removable by azeotropic distillation with water.

7. The process according to claim 1 wherein the concentration of said first and second water-soluble polymers in said aqueous suspension medium is from 0.02 to 20% by weight.

8. The process according to claim 1 wherein the final concentration of said liquid thermosetting resin composition in said suspension is from 10 to 50% by weight.

9. The process according to claim 1 wherein said liquid thermosetting resin composition comprises a binder resin and a crosslinker.

10. The process according to claim 9 wherein said binder resin is an epoxy, acrylic or polyester resin.

11. A powder coating composition comprising the thermosetting resin particles produced by the process of claim 9.

12. A powder coating composition comprising the thermosetting resin particles produced by the process of claim 10.

13. A process for the production of thermosetting resin particles, comprising heating an aqueous suspension of an organic solvent-containing, liquid thermosetting resin composition suspended as primary particles of oil droplets having a number average particle size of less than 10 μm in a dispersing medium containing a first water-soluble polymer having a cloud point of 30°–90° C. and a second water-soluble polymer not having any cloud point, from a temperature below to a temperature above the cloud point of the first water-soluble polymer, whereby the primary particles agglomerate and fuse into secondary particles having a number average particle size from 2 to 20 times greater than that of the primary particles.

14. A process according to claim 13, wherein the dispersing medium further contains a dye, a pigment, a UV absorber or an antioxidant.

15. A process according to claim 14, wherein the dispersing medium contains a pigment which is titanium dioxide, ferric oxide, yellow iron oxide, carbon black, phthalocyanine blue or quinacridon red.

16. A process according to claim 13, wherein the liquid thermosetting resin is a polyester, (meth)acrylate ester copolymer, aromatic vinyl compound copolymer, epoxy resin, phenol resin, melamine-formaldehyde resin or urea-formaldehyde resin.

17. A coated article, having thereon a coating composition of claim 11.

18. A coated article, having thereon a coating composition of claim 12.

* * * * *